United States Patent
Buda et al.

(10) Patent No.: US 7,706,823 B2
(45) Date of Patent: Apr. 27, 2010

(54) METHOD AND SYSTEM FOR SYNCHRONIZING A BASE STATION OF A WIRELESS COMMUNICATION SYSTEM AND A SUBSCRIBER COMMUNICATION EQUIPMENT

(75) Inventors: Fabien Buda, Paris (FR); Emmanuel Lemois, Paris (FR); Bertrand Debray, Maisons Laffitte (FR)

(73) Assignee: Sequans Communications, Paris La Defense (FR)

( * ) Notice: Subject to any disclaimer, the term of this patent is extended or adjusted under 35 U.S.C. 154(b) by 759 days.

(21) Appl. No.: 11/477,916

(22) Filed: Jun. 30, 2006

(65) Prior Publication Data

US 2007/0019767 A1   Jan. 25, 2007

(30) Foreign Application Priority Data

Jul. 1, 2005   (EP)   ................................. 05291431

(51) Int. Cl.
*H04Q 7/20* (2006.01)
(52) U.S. Cl. .................. 455/502; 455/501; 455/500; 455/517; 455/69; 455/561; 370/350; 370/503; 370/509; 370/347; 370/512; 375/354; 375/356; 375/358; 375/355; 375/359
(58) Field of Classification Search .......... 455/502, 455/501, 500, 517, 69, 522, 422.1, 550.1, 455/561, 445; 370/310, 350, 503, 509, 510, 370/512, 342, 347; 375/354, 356, 358, 355, 375/359
See application file for complete search history.

(56) References Cited

U.S. PATENT DOCUMENTS

| 5,889,759 | A | | 3/1999 | McGibney |
| 6,021,110 | A | * | 2/2000 | McGibney ................... 370/208 |
| 6,028,883 | A | * | 2/2000 | Tiemann et al. ............. 375/150 |
| 2003/0026371 | A1 | | 2/2003 | Laroia et al. |
| 2004/0120387 | A1 | * | 6/2004 | Bultan et al. ................ 375/149 |

FOREIGN PATENT DOCUMENTS

| EP | 0453203 A | 10/1991 |
| WO | 2004/010624 | 1/2004 |

OTHER PUBLICATIONS

International Search Report.

* cited by examiner

*Primary Examiner*—Keith T Ferguson
(74) *Attorney, Agent, or Firm*—Young & Thompson

(57) ABSTRACT

A method of synchronizing a base station of a wireless communication system and a subscriber communication equipment located in the coverage area of the base station by compensating a sampling frequency offset in the subscriber equipment by interpolating input and/or output signals of a radio frequency part of the communication equipment to generate samples corresponding to the original symbol timing of the base station, and compensating the carrier frequency offset from the estimate of the sampling clock error.

15 Claims, 3 Drawing Sheets

METHOD AND SYSTEM FOR SYNCHRONIZING A BASE STATION OF A WIRELESS COMMUNICATION SYSTEM AND A SUBSCRIBER COMMUNICATION EQUIPMENT

CROSS-REFERENCE TO RELATED APPLICATIONS

The present application incorporates by reference and claims benefit of priority to European Patent Application No. 05 291 431.4 filed Jul. 1, 2005.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The present invention relates to wireless communication systems and, in particular, to wireless communication systems based on the IEEE 802.16 specifications.

However, the invention also applies in general to any communication system in which the carrier and sampling clock frequencies of all the signals transmitted between the base station and the subscriber equipment are locked to a same and unique reference clock frequency derived from a reference oscillator of the base station.

2. Description of Related Art

As a matter of fact, in wireless communication networks, a base station serves a number of users that are located in its coverage area. This is the case in the current mobile cellular networks including GSM, third-generation mobile cellular networks (UMTS, CDMA 2000, . . . ), wireless local area networks (WiFi) and broadband wireless access networks (WiMax). Most of recent wireless communication standards are based on the multicarrier transmission technique known as orthogonal frequency-division multiplexing (OFDM). Indeed, the IEEE 802.11a specifications for WiFi are based on 64-carrier OFDM and the mode of IEEE 802.16 specifications adopted by WiMax is based on 256-carrier OFDM.

In a number of system specifications including WiMax, the transmit center frequency, receive center frequency and the symbol clock frequency at the base station must be derived from the same reference oscillator. The subscriber station or equipment may use this relationship between the symbol clock frequency and the base station transmit center frequency to avoid explicitly estimating the receive center frequency. The receive carrier frequency at the subscriber equipment may be indeed derived from the symbol clock frequency, and in this case a simple timing estimator is sufficient to perform timing and carrier frequency estimation.

In the IEEE 802.16 specifications, both the transmit center frequency and the symbol clock frequency of the subscriber equipment must be synchronized and locked to the base station with a precision better than 2% of the OFDM sub-carrier spacing. During the synchronization period, the subscriber equipment must acquire frequency synchronization within the specified tolerance before attempting any uplink transmission. During normal operation, the subscriber equipment must track the frequency changes and defer any transmission if synchronization is lost.

Reference is now made to FIG. 1 which illustrates a simplified block diagram of a conventional symbol timing recovery device of subscriber equipment highlighting the position of the symbol timing functions within the overall receiver structure.

As illustrated in FIG. 1, the timing recovery device, denoted by reference 10, is placed between the radio frequency part 12 and the digital modem 14 of a subscriber equipment or station, such as a mobile cellular phone terminal, and is partly incorporated within the modem 14.

The timing recovery device comprises essentially a phase locked loop (PLL) circuit 16 comprising a timing error detector 18, a loop filter 20 and a voltage-controlled crystal oscillator (VCXO) 22.

In this conventional scheme, the PLL circuit is used to control a clock generator 24, the output of which delivers a receive sampling clock RX sampling clock and a transmit sampling clock TX sampling clock to an analog-to-digital converter circuit 26 and to a digital-to-analog converter circuit 28, respectively, which communicate with a digital demodulator 17 and a digital modulator 19.

In addition, the clock generator 24, which is composed of a PLL and a direct digital synthesis DDS clock, provides the radio frequency part 12 of the equipment with a reference clock RF part reference clock in order to control this radio frequency part accordingly.

As a matter of fact, the voltage-controlled oscillator VCXO adjusts the frequency and, hence, the phase according to the loop filter output. This frequency, which is locked to the base station, is used to generate the sampling frequency for the analog-to-digital (A/D) converter 26 and the carrier frequency of the RF receiver of the radio frequency part 12. On the other hand, it is also used to generate the sampling frequency for digital-to-analog (D/A) converter 28 and the carrier frequency of the RF transmitter of the radio frequency part 12.

The loop filter is employed to limit the variance of the noise in the error signal generated by the error detector 18. Hence, its bandwidth determines the performance of the PLL when noise is present. The smaller the bandwidth of the loop filter, the smaller is the variance of the noise in the error signal.

On the other hand, the tracking ability of the PLL is also determined by the loop filter bandwidth. A larger bandwidth enables the PLL to track rapidly changing phase. Therefore, the bandwidth of loop filter is chosen as a compromise between robustness to noise and tracking ability.

With this scheme, the sampling frequency and carrier frequency are adjusted by controlling the reference clock via the VCXO. This solution requires costly analog components like VCXO and DDS clock.

BRIEF SUMMARY OF THE INVENTION

In view of the foregoing, the invention aims at providing a method and a device for synchronizing a base station of a wireless communication system and a subscriber communication equipment located in the coverage area of the base station in which the drawback of the systems according to the state of the art are overcome.

Accordingly, according to a first aspect, the present invention concerns such a method for synchronizing a base station of a wireless communication system and a subscriber communication equipment located in the coverage area of the base station, comprising the steps of compensating a sampling frequency offset in the subscriber equipment by interpolating input and/or output signals of a radio frequency part of the communication equipment to generate samples corresponding to the original symbol timing of the base station, and compensating a carrier frequency offset from the estimate of the sampling clock error.

According to this method, the steps of compensating the carrier frequency offset are carried out by generating control signal and providing the radio frequency part of the subscriber communication equipment with said control signals.

According to another feature of the method according to the invention, the sampling frequency in the subscriber equipment is adjusted to the original symbol timing using a feed back loop. In addition, the error between master clock frequency on the subscriber equipment side and the master clock frequency on the base station side is estimated from the increment value of a numerically controlled oscillator of the feed back loop.

For example, the frequency error is estimated from the relation:

$$\frac{NCOIncr}{NCOIncr_{theory}} = 1 + \hat{X}$$

with:

$$(1 + X) = \left(\frac{F_{BS} + \Delta F_{SS/BS}}{F_{BS}}\right)$$

and in which:
  $F_{BS}$ is the base station master clock frequency;
  $\Delta F_{SS/BS}$ is a subscriber equipment master clock offset with respect to the base station;
  X is subscriber master clock error with respect to base station (expressed in parts per million) and $\hat{X}$ is its estimate;
  $NCOIncr_{Theory}$ is the theoretical increment of the numerically controlled oscillator; and
  NCOIncr is the measured increment of the numerically controlled oscillator.

According to another feature of the invention, the method further comprises the step of calculating the downlink carrier frequency by the subscriber equipment from its master clock frequency error.

The downlink carrier frequency may be calculated from the relation:

$$DLFrequency_{SS} = \frac{1}{1 + \hat{X}} DLFrequency$$

in which the DL denotes the downlink carrier frequency of the subscriber equipment.

In the same manner, the uplink carrier frequency may be calculated from the relation:

$$ULFrequency_{SS} = \frac{1}{1 + \hat{X}} ULFrequency$$

in which UL denotes the uplink carrier frequency of the subscriber equipment.

According to a further feature of the invention, the computed carrier frequency is divided into a coarse carrier frequency applied to the radio frequency part of the subscriber communication and the fine carrier frequency applied to a digital rotator used to compensate the carrier offset in addition to said radio frequency part.

According to another aspect, the invention concerns a device for synchronizing a base station of a wireless communication system and a subscriber communication equipment located in the coverage area of the base station, comprising an interpolator for interpolating input and/or output signals of a radio frequency part of the communication equipment to generate samples corresponding to the original symbols timing of the base station, and calculating means for compensating the carrier frequency offset from the estimate of the sampling clock error.

In one embodiment, the device further comprises a feedback loop for controlling timing of the interpolator to compensate sampling frequency offset, said feed back loop having a numerically controlled oscillator.

In addition, the calculating means comprise means for estimating a frequency error between a master clock frequency on the subscriber equipment side and a master clock frequency on the base station side from the value of the numerically controlled oscillator.

At last, according to a third aspect, the invention also relates to a wireless telecommunication equipment comprising a device for synchronizing a base station of a wireless communication system and the wireless telecommunication equipment when located in the coverage area of the base station as defined above.

BRIEF DESCRIPTION OF THE SEVERAL VIEWS OF THE DRAWINGS

These and other attributes of the present invention will be described with respect to the annexed drawings in which.

DETAILED DESCRIPTION OF THE INVENTION

Figure 1:
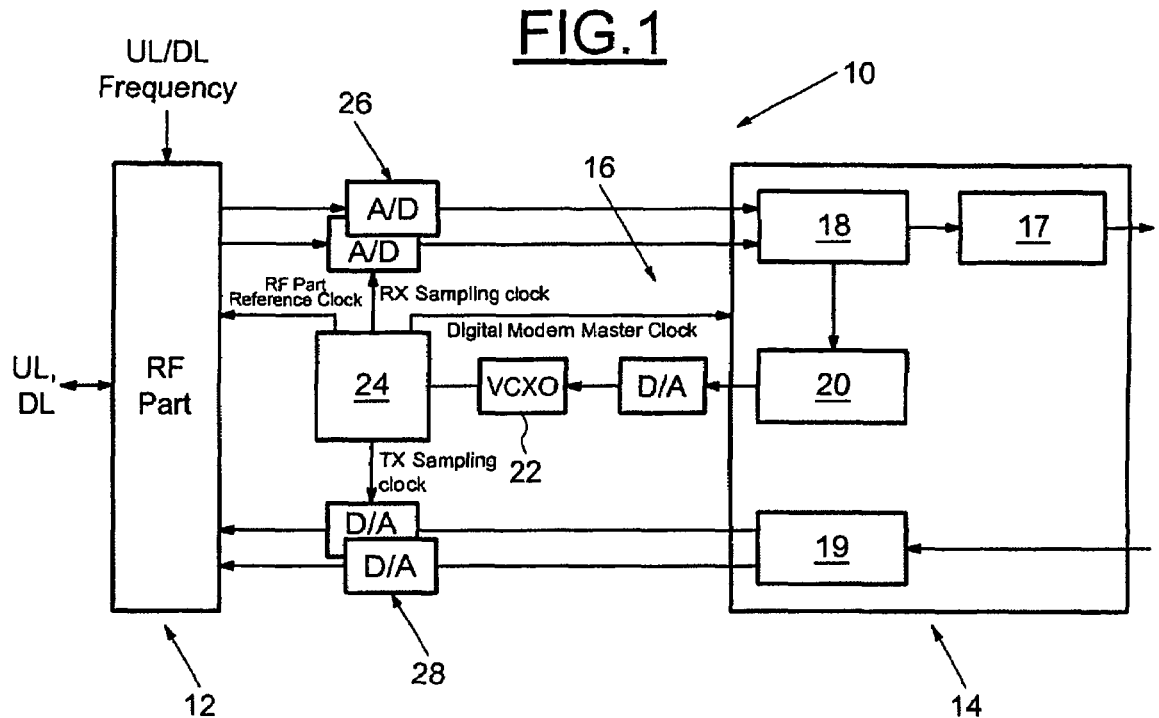
FIG. 1, already mentioned, shows a simplified block diagram of a conventional device for synchronizing a base station of a wireless communication system and a subscriber communication equipment.
Figure 2:
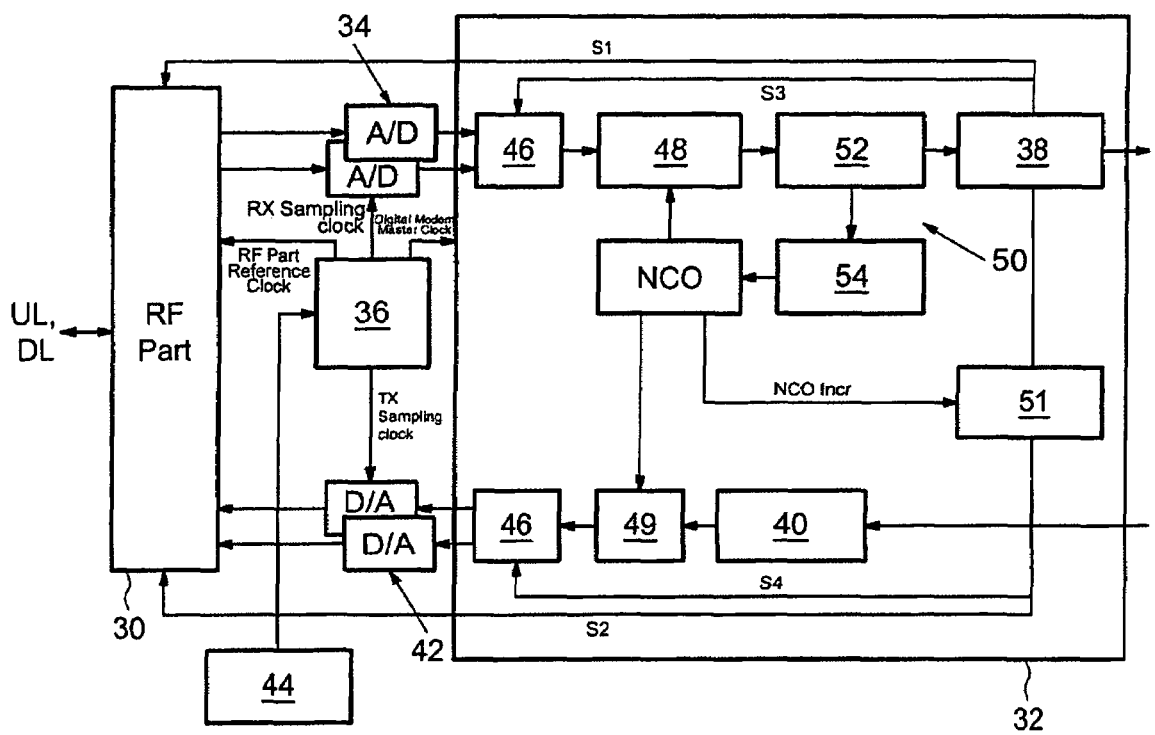
FIG. 2 is a simplified block diagram of a synchronizing device according to the invention.

Referring first to FIG. 2, a simplified block diagram of a synchronizing device of a subscriber communication equipment of a wireless communication system is disclosed.

This device is intended to recover a carrier frequency of the base station of the wireless communication system in order to synchronize the subscriber equipment and the base station.

In addition, this device is intended to compensate sampling frequency errors created during analog-to-digital conversion and during digital-to-analog conversion.

As will be explained below in detail, instead of adjusting the reference clock as in the device according to the state of the art, synchronization in the device according to the invention is based on a digital interpolation of the input/output signals in order to compensate sampling frequency errors, and estimate the carrier frequency, namely the transmission carrier frequency and the reception carrier frequency.

As shown in FIG. 2, the synchronizing device is essentially implemented between the radio frequency (RF) part 30 and the digital modem 32 of the communication equipment.

As a matter of fact, the radio frequency part 30 is intended to receive and transmit downlink DL and uplink UL signals, respectively.

The downlink signals received by the RF receiver of the RF part 30 are sampled by an analog-to-digital converters stage 34 under the control of a reception sampling clock RX sampling clock issued by a clock generator 36 and are transmitted to the digital modem 32 to be demodulated by a demodulator 38 in a known manner for a subsequent treatment.

Besides, signals to be transmitted by the subscriber equipment are issued from a digital modulator 40 in a known manner and from a digital-to-analog converter stage 42. After conversion, the analog signals are transmitted by the RF transmitter of the radio frequency part 30, as known per se.

For controlling the radio frequency part and the converter stages 34 and 42, the clock generator 36 is driven by a free local oscillator 44 and provide the radio frequency part 30 with a reference clock denoted RF part reference clock, and the analog-to-digital converter stage 34 and the digital-to-analog converter 42, respectively, with sampling clocks denoted sampling clock RX and TX sampling clock.

In addition, the clock generator 36 provides the digital modem 32 with a digital modem master clock denoted digital modem master clock.

Accordingly, the reference clock generated by the clock generator 36 is substantially independent from the reference clock on the base station side. Instead, the subscriber equipment digitally interpolates the input and output signals to compensate sampling frequency errors and synchronizes the carrier frequency, namely the transmission and reception carrier frequencies by sending digital control signals S1 and S2 to the radio frequency part 30 and control signals S3 and S4 to rotators 46 associated with the converter stages 34 and 42.

For that purpose, the synchronizing device of the subscriber equipment comprises an interpolator 48 used, as analog-to-digital sampling in the receiver is asynchronous, to generate samples corresponding to an original symbol timing in the transmitter.

As shown in FIG. 2, the exact timing of the interpolator is adjusted via a feedback loop 50 comprised of an error detector 52, a digital loop filter 54 and a numerically controlled oscillator NCO.

As will be explained in detail below, the value of the NCO is used by a calculating stage 51 to compute the control signals S1, S2, S3 and S4.

Besides, as concerns the carrier frequency offset, namely for synchronizing the TX and RX carrier frequencies, the objective is to compute the value that should be programmed in the radio frequency part. The subscriber equipment free local oscillator error relative to the base station may be derived from the NCO value after the timing synchronization is completed. This error, denoted X, is then used by the calculating stage 51 to estimate the carrier frequency error. According to the frequency resolution of the RF part, this frequency offset could be mainly compensated at the RF stage and the residual frequency error in the baseband rotator 46.

Once locked, that is to say when the timing synchronization is completed, the calculating stage 51 of the subscriber equipment can estimate its master clock error with respect to the base station clock as follows:

$$\frac{NCOIncr}{NCOIncr_{theory}} = 1 + \hat{X}$$

with:

$$(1 + X) = \left(\frac{F_{BS} + \Delta F_{SS/BS}}{F_{BS}}\right)$$

and in which:

$F_{BS}$ is the base station master clock frequency $\Delta F_{SS/BS}$ is a subscriber equipment master clock offset with respect to the base station;

X is the subscriber equipment master clock error with respect to the base station, constituting also the master block error, the sampling clock error and the carrier frequency error, as these errors are equal, and $\hat{X}$ its estimate;

$NCOIncr_{Theory}$ is the theoretical increment of the NCO (i.e. the increment programmed as if the master clock frequency at the subscriber equipment were identical to that of the base station); and NCOIncr is the measured NCO increment once the subscriber equipment is locked.

Figure 3:
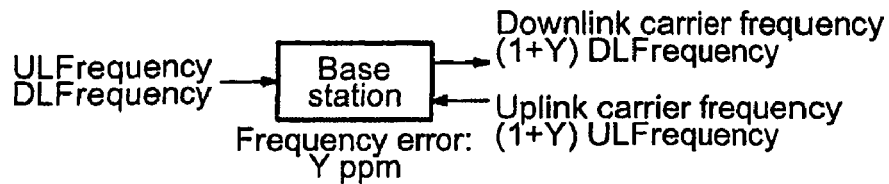
FIGS. 3 and 4 are block diagrams showing the frequency errors in the downlink carrier frequency and uplink carrier frequency on the base station side, on the one hand, and in the subscriber equipment, on the other hand.
Figure 4:
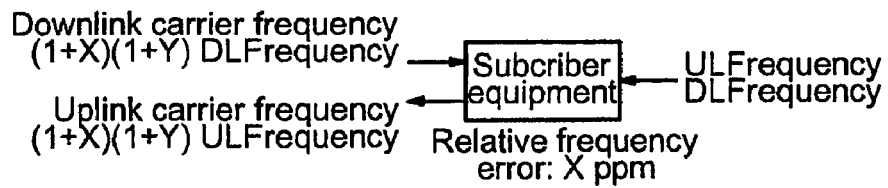

Reference in now made to FIGS. 3 and 4. Let DLFrequency be the downlink carrier frequency and Y the base station master clock offset from the nominal frequency. The subscriber equipment master clock offset is then equal to $(1+X)(1+Y)$ and as a result, the actual carrier frequency at the subscriber equipment is:

$$RXFrequency_{ss} = (1 + Y)(1 + X)DLFrequency$$
$$= (1 + X)TXFrequency_{BS}$$

with $TXFrequency_{BS}$ the actual downlink carrier frequency on the base station side.

Figure 5:
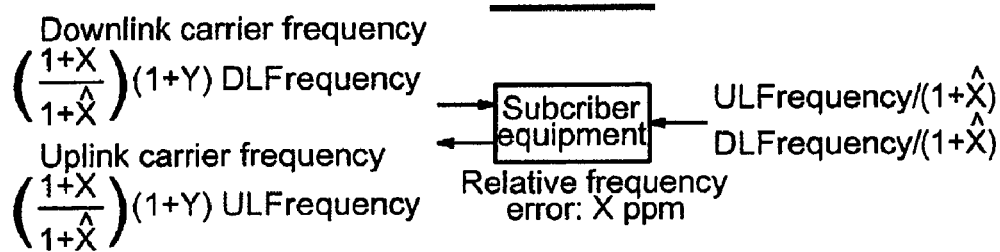
FIG. 5 illustrates the recovery process for recovering the downlink carrier frequency and the uplink carrier frequency on the subscriber equipment side.

Referring now to FIG. 5 which illustrates the uplink/downlink carrier frequencies on the subscriber equipment side, after compensation, the objective of the subscriber equipment is to set its carrier frequency denoted $RXFrequency_{ss}$ equal to $TXFrequency_{BS}$.

Therefore, the frequency to be programmed is:

1/(1+$\hat{X}$)DLFrequency.

This frequency is divided into a coarse carrier frequency applied to the RF part and a fine carrier frequency applied to the digital rotator 46.

The carrier frequency error is tracked by polling the NCO increment and computing the carrier frequency error. Since the receiver can handle a carrier frequency error up to 2% of the sub-carrier spacing, the carrier frequency value is not necessarily updated each time the NCO increment is modified.

On the transmission side, a fractional interpolator 49 controlled by the NCO is used to generate the transmit symbol clock. Like in reception path, the pilot frequency error is used to compute the transmit carrier frequency. On the base station side, the actual receive carrier frequency denoted RXFrequency$_{BS}$ is equal to:

(1+Y)ULFrequency with ULFrequency the uplink carrier frequency value. The subscriber equipment aims at setting its uplink carrier frequency value equal to this value. Therefore, it must program 1/(1+$\hat{X}$)ULFrequency to get the right uplink carrier frequency.

Figure 6:
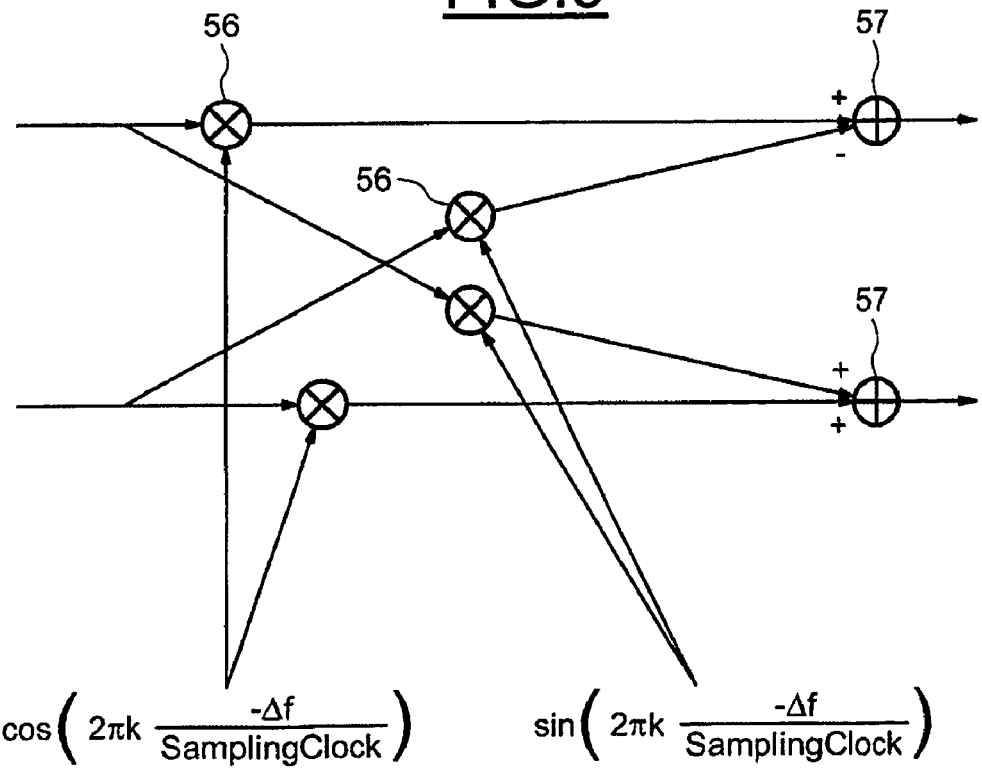
FIG. 6 is a block diagram of rotator used in the synchronizing device according to the invention.
Figure 7:
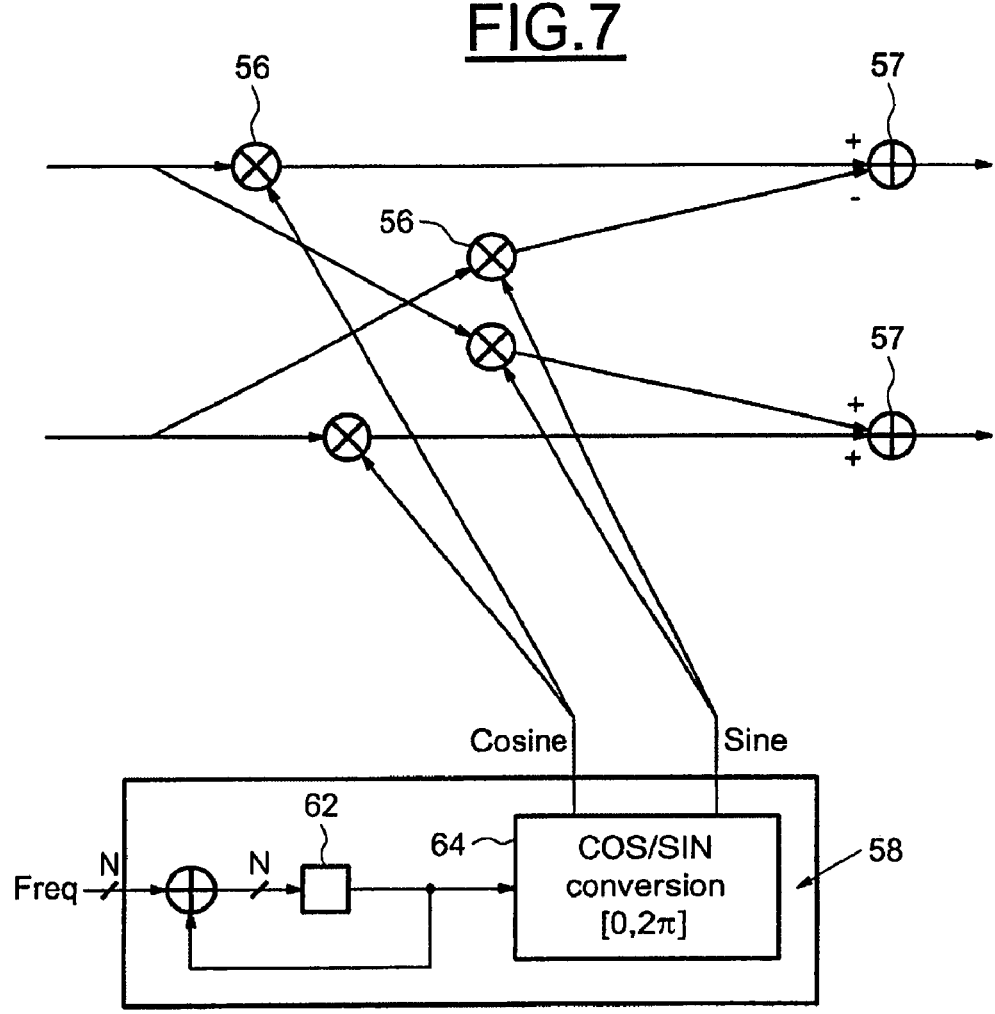
FIG. 7 shows an example of architecture of the rotator of FIG. 6.

Reference is now made to FIGS. 6 and 7 which illustrate examples of embodiment of the rotator 46 architecture and of the digital loop filter 50. It should be noted that the architecture disclosed at FIGS. 6 and 7 concerns the received part of a subscriber equipment. The transmission part has a similar architecture, a man skilled in the art knowing that the only difference between the receive and transmission parts consisting essentially in replacing $-\Delta f$ in the receive part by $\Delta f$ to elaborate the transmission part.

As indicated above, the rotator 46 is used to compensate for carrier offset, denoted $\Delta f$. The frequency correction consists in mixing the input signal with a complex exponential at frequency $-\Delta f$ as illustrated in FIG. 6. This frequency $\Delta f$ corresponds to the carrier frequency offset of the received signal and is an input of the rotator.

FIG. 7 depicts a possible architecture of the rotator 46. It consists of multipliers 56 and adders 57 and a numerically controlled oscillator 58 (NCO). The frequency $-\Delta f$ is determined by the input parameter Freq representing the frequency increment. The accumulator output, named phase value, is used to address a cosine/sine table and generate the corresponding sine and cosine values.

The NCO uses a frequency tuning word Freq, and is made of a N-bit accumulator 62 and a phase to sine/cosine converter 64.

The equation relating output frequency of the NCO to the frequency tuning word and the reference clock (sampling clock) is given as:

$$Freq = 2^N \cdot \left(1 - \frac{\Delta f}{SamplingClock}\right)$$

where $\Delta f$ and SamplingClock frequencies are in Hz and Freq is a decimal number between 0 and $2^N-1$.

A look-up table in which the sine and cosine values are stored in a Read Only Memory (ROM) performs the NCO phase (accumulator output) to sine/cosine conversion. Each time a phase value is generated, this value is used as an address to the look-up table that returns to corresponding sine and cosine values.

Figure 8:
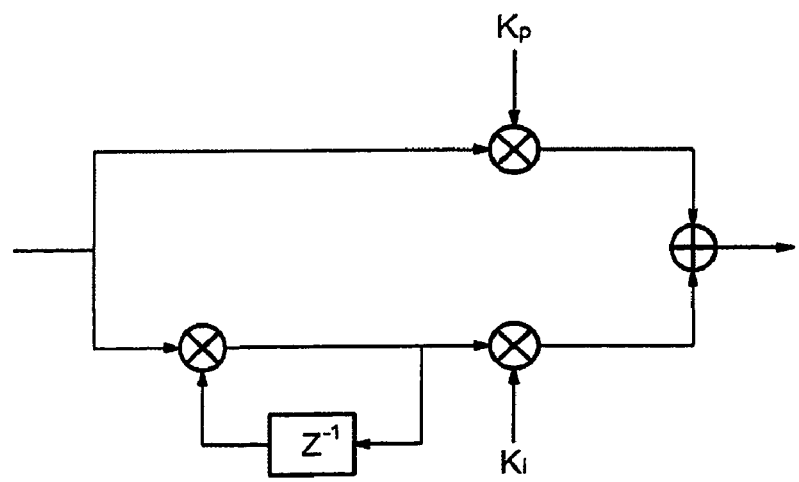
FIG. 8 shows an example of embodiment of the digital loop filter of the synchronizing device according to the invention.

As concerns the symbol timing recovery, reference is now made to FIG. 8.

The error detector realized by the PLL loop 50 is based on an algorithm that relies on the preamble detection.

The transfer function is given by:

$$F(z) = \frac{(K_i + K_p) - K_p z^{-1}}{1 - Z^{-1}}$$

Appropriate values for $K_i$ and $K_p$ can be determined from the measured gain of the timing detector, the desired loop noise bandwidth $B_L$, the desired damping ratio.

An example of diagram of a P1 loop filter is shown in FIG. 8.

As it can be appreciated, according to the synchronizing devices of the state of the art, a voltage controlled crystal oscillator is used to generate a reference clock whose frequency is generally lower than 30 MHz. The input voltage of the oscillator is controlled by a baseband receiver and, as a result, a digital-to-analog converter is required to generate the analog input voltage. A phase locked loop is used to generate a digital modem master clock. A direct digital synthesized clock is derived from the PLL output to drive the analog-to-digital converter or the digital-to-analog converter. In addition, the frequency of the sampling clock is dependent from the signal bandwidth.

On the contrary, according to the present invention, in order to reach the required sampling rate, a digital modem part is in charge of interpolating the input signal. By adjusting the RX and TX sampling frequency at two times the required sampling rate, the interpolator can be implemented using a simple linear interpolator.

In practice, the master clock and as a result the sampling clock frequency can be set equal to a fixed value that does not depend on the bandwidth. In such a configuration, a digital decimator is implemented in the reception part between the rotator and the interpolator, and an additional interpolator is implemented in the transmission part between the rotator and the interpolator. The digital decimator aims at decimating the input signal in order to reach the required sample rate at the interpolator input. The additional interpolator aims at performing the inverse operation.

The invention claimed is:

1. A method for synchronising a base station of a wireless communication system and a subscriber communication equipment located in the coverage area of the base station, comprising:
   compensating a sampling frequency offset in the subscriber equipment by interpolating at least one of input and output signals of a radio frequency part (30) of the communication equipment to generate samples corresponding to an original symbol timing of the base station, and
   compensating a carrier frequency offset from the estimate of a sampling clock error.

2. The method according to claim 1, wherein the steps of compensating the carrier frequency offset are carried out by generating control signal and providing the radio frequency part (30) of the subscriber communication equipment with said control signals.

3. The method according to claim 2, wherein that wherein the sampling frequency in the subscriber equipment is adjusted to the original symbol timing using a feedback loop (50), and in that frequency error (X) between master clock frequency on the subscriber equipment side and the master clock frequency on the base station side is estimated from the increment value of a numerically controlled oscillator (NCO) of the feed back loop.

4. The method according to claim 1, wherein that wherein the sampling frequency in the subscriber equipment is adjusted to the original symbol timing using a feedback loop (50), and in a frequency error (X) between master clock frequency on the subscriber equipment side and the master clock frequency on the base station side is estimated from the increment value of a numerically controlled oscillator (NCO) of the feed back loop.

5. The method according to claim 4, wherein that wherein the frequency error is estimated from the relation:

$$NCOIncr/NCOIncr_{theory} = 1 + \hat{X}$$

with:

$$(1+X) = ((F_{BS} + \Delta F_{SS/BS})/F_{BS})$$

and in which:

$F_{BS}$ is the base station master clock frequency;

$\Delta_{FSS/BS}$ is a subscriber equipment master clock offset with respect to the base station;

X is subscriber master clock error with respect to base station (expressed in parts per million) and $\hat{X}$ is its estimate;

$NCOIncr_{Theory}$ is the theoretical increment of the numerically controlled oscillator; and NCOIncr is the measured increment of the numerically controlled oscillator.

6. The method according to claim 5, wherein that wherein it further comprises the step of calculating the downlink carrier frequency by the subscriber equipment from its master clock frequency error.

7. The method according to claim 4, the method further comprises the step of calculating the downlink carrier frequency by the subscriber equipment from its master clock frequency error.

8. The method according to claim 7, wherein the downlink carrier frequency is calculated from the relation:

$$DLFrequency_{SS} = (1/(1+\hat{X}))DLFrequency$$

in which DLFrequency denotes the downlink carrier frequency of the subscriber equipment.

9. The method according to claim 8, wherein the computed carrier frequency is divided into a coarse carrier frequency applied to the radio frequency part (30) of the subscriber communication and a fine carrier frequency applied to a digital rotator (46) used to compensate the carrier offset in addition to said radio frequency part.

10. The method according to claim 7, wherein the uplink carrier frequency is calculated from the relation:

$$ULFrequency_{SS} = (1/(1+\hat{X}))ULFrequency$$

in which ULFrequency denotes the uplink carrier frequency of the subscriber equipment.

11. The method according to claim 10, wherein that wherein the computed carrier frequency is divided into a coarse carrier frequency applied to the radio frequency part (30) of the subscriber communication and a fine carrier frequency applied to a digital rotator (46) used to compensate the carrier offset in addition to said radio frequency part.

12. A device for synchronising a base station of a wireless communication system and a subscriber communication equipment located in the coverage area of the base station, comprising:

an interpolator (48) interpolating input and/or output signals of a radio frequency part of the communication equipment to generate samples corresponding to an original symbol timing of the base station, and calculating means (51) for compensating a carrier frequency offset from the estimate of a sampling clock error.

13. The device according to claim 12, further comprising: a feedback loop (50) controlling timing of the interpolator to compensate sampling frequency offset, said feedback loop having a numerically controlled oscillator, and in that calculating means (51) comprise means for estimating a frequency error (X) between a master clock frequency on the subscriber equipment side and a master clock frequency on the base station side from the value of the numerically controlled oscillator.

14. The device according to claim 13, further comprising: telecommunication equipment synchronising a base station of a wireless communication system and the wireless telecommunication equipment when located in the coverage area of the base station.

15. The device according to claim 12, further comprising: telecommunication equipment, synchronising a base station of a wireless communication system and the wireless telecommunication equipment when located in the coverage area of the base station.

* * * * *